J. GECMEN.
Beer Cooler.

No. 83,953.  
Patented Nov. 10, 1868.

Witnesses:  
W. E. Mans  
L. L. Cleburn

Inventor:  
Jos. Gecmen

JOSEPH GECMEN, OF CHICAGO, ILLINOIS, ASSIGNOR TO HIMSELF AND LEOPOLD J. KADISH, OF THE SAME PLACE.

Letters Patent No. 83,953, dated November 10, 1868.

IMPROVED BEER-COOLER.

The Schedule referred to in these Letters Patent and making part of the same.

*To all whom it may concern:*

Be it known that I, JOSEPH GECMEN, of Chicago, in the county of Cook, and State of Illinois, have invented a new and useful Apparatus for Cooling Beer; and I do hereby declare and make known that the following is a full, clear, and exact description of the same, reference being had to the accompanying drawings, and the letters and figures marked thereon, which form part of this specification.

My invention consists in a novel apparatus for cooling beer, ale, and other malt liquors, and other fluids requiring similar treatment; and to enable those skilled in the art to understand how to construct and make use of my said improvement, I will proceed to describe the same with particularity, making reference in so doing to the aforesaid drawings, in which—

Figure 1:
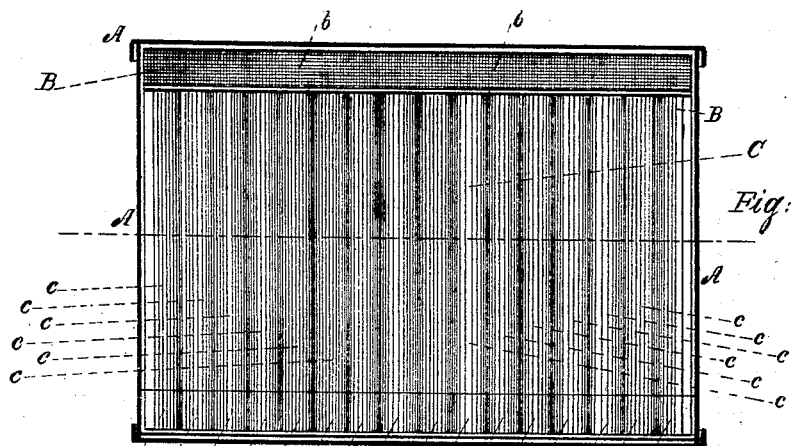
Figure 2:
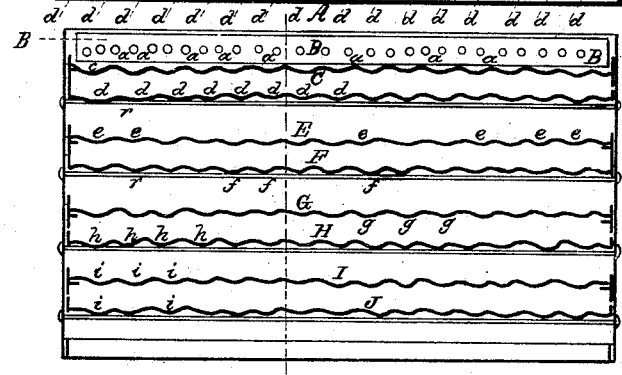

Figure 1 represents a plan or top view of my invention;

Figure 2, a vertical cross-sectional view at the red line in fig. 1; and

Figure 3:
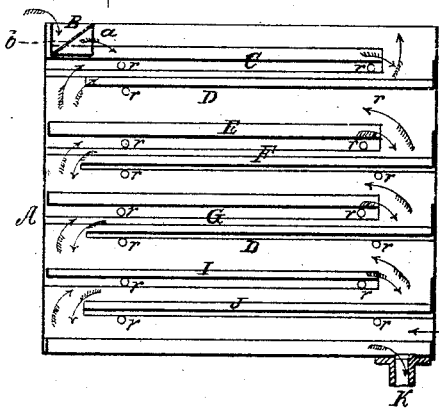

Figure 3 is a vertical section of the same at the red line in fig. 2.

Similar letters of reference indicate the same parts of my invention in the different figures.

A represents a suitable enclosure of the apparatus, constructed of sheet-iron, or other suitable material, which may be covered or not, as preferred, and may have one or both of its ends hinged, or otherwise constructed so as to open or be removed, when desired.

B represents a long trough, extending entirely across one end of the apparatus, as shown, said trough being divided into two parts, longitudinally, by a gauze diaphragm, marked $b$, which serves as a strainer, through which the beer, when introduced into the trough or vat, passes, to go out at the perforations $a$ below said diaphragm, and in the side of said trough, as clearly seen in fig. 3.

C D E F G H I J are corrugated plates, of sheet-iron, or other suitable material, said corrugations being so formed as to form shallow channels, along which the beer, passing out in fine streams through the holes $a$, runs, as indicated by the arrows, from one pan to the other below in the series, until it finally passes out at the pipe or outlet K in the bottom.

The alternate arrangement of the series of pans, corrugated as aforesaid, so shortened at opposite ends as to allow the beer to flow from one pan down upon the one below it, is clearly seen in fig. 3.

The said pans are supported by resting upon appropriate brackets or stops upon the sides of the enclosure, and upon removable or irremovable rods or bars, $r$, passing across the apparatus, as shown.

The said pans may be permanently secured in place in the enclosure A, or may be so arranged as to be removable, when desired.

At L is an opening, through which a current of cold air from an ice-house may be forced into the apparatus, passing up through the series of pans, as indicated by the red arrows, coming in contact with the shallow streams of beer passing in the opposite direction along the shallow channels or corrugations in the pans, thus perfectly cooling the beer, as desired.

Two of the above-described arrangements may be used together, one being placed over the other, the beer passing from the upper one into the lower one, and a blast of air, of the ordinary temperature, may be forced into the upper one, and a blast of ice-house or chilled air into the lower one, if desired.

Having described the construction and operation of my invention, I will specify what I claim, and desire to secure by Letters Patent.

1. I claim a series of corrugated pans, constructed and arranged substantially in the manner and for the purpose shown and described.

2. In combination with a series of pans, arranged as specified, I claim a trough, B, provided with a strainer, $b$, and outlets, $a$, arranged substantially in the manner and for the purposes described and set forth.

3. I claim the opening L, in the enclosure A, below the series of cooling-pans, for the purposes specified.

JOS. GECMEN.

Witnesses:
W. E. MARRS,
L. L. COBURN.